United States Patent [19]

McNall

[11] 4,030,907
[45] June 21, 1977

[54] COPPER ALGAECIDE OF INCREASED STABILITY AND METHOD OF PRODUCING THE SAME

[75] Inventor: Lester Ray McNall, Fullerton, Calif.

[73] Assignee: Thompson-Hayward Chemical Co., Kansas City, Kans.

[22] Filed: June 12, 1974

[21] Appl. No.: 478,827

[52] U.S. Cl. .................................................. 71/67
[51] Int. Cl.$^2$ ......................................... A01N 11/04
[58] Field of Search ......................................... 71/67

[56] References Cited

UNITED STATES PATENTS 2,734,028   2/1956   Domogalla ............................. 71/67
3,716,351   2/1973   Kunkel et al. ......................... 71/67

OTHER PUBLICATIONS

Batyok et al., Chem. Abst., vol. 77 (1972), 92699a.
Brown et al., Chem. Abst., vol. 36, 4951, 1942.
Gamborg et al., Chem. Abst., vol. 73 (1970), 65525b.
Frazier, Chem. Abst., vol. 75, 1971, 139860x.
Petrea, Chem. Abst., vol. 74, 1971, 29151p.
Subrahmanya, Chem. Abst., vol. 52 (1958), 13482i.
Arkhipov, Chem. Abst., vol. 53 (1959), 15714f.

*Primary Examiner*—Lewis Gotts
*Assistant Examiner*—Catherine L. Mills
*Attorney, Agent, or Firm*—K. M. Le Fever

[57] ABSTRACT

An algaecide composition having an improved ability to withstand photodecomposition comprising an aqueous solution containing a complex of a copper salt with an alkanolamine and an ammonium compound.

19 Claims, No Drawings

COPPER ALGAECIDE OF INCREASED STABILITY AND METHOD OF PRODUCING THE SAME

The invention in this case relates to an algaecide composition of improved stability and to a method of producing such a composition.

In order to destroy and prevent the growth of algae in streams, lakes, drinking water and industrial water supplies, as well as in other types of water systems, it has long been known to employ soluble copper salts.

However, in waters containing significant amounts of carbonates, bicarbonates or other dissolved solids, the copper is frequently precipitated out in the form of insoluble copper carbonates and hydroxides. In order to prevent the formation of insoluble copper hydroxides and carbonates and to keep copper ions in solution in water containing even high concentrations of carbonates, bicarbonates or other dissolved solids, the use of a complex formed by the reaction of copper and an alkanolamine has been proposed, for example, by Domogalla, U.S. Pat. No. 2,734,028.

It has been found however, that when a concentrated solution of such a complex is stored for a long period of time, and particularly if it is exposed to sunlight, decomposition of the complex frequently occurs resulting in precipitation of the copper.

The concentrated solutions in which precipitation of copper has occurred is ineffective in preventing algae growth when diluted because of the loss of the toxic copper ions from solution. In addition, the precipitated copper tends to form a sludge which is destructive of fish life in lakes and brooks.

In U.S. Pat. No. 3,716,351, there is disclosed the addition of an acetylenic diol and an alkali halogenate such as sodium chlorate in order to increase the stability of copper-alkanolamine complex solutions.

However, such compositions are relatively expensive and thus are not economically feasable for use for many purposes.

According to the invention, a new and novel method of increasing the stability of copper-alkanolamine complex solutions has been found. The applicant has unexpectedly found that the incorporation of a water-soluble ionizable ammonium compound provides an excellent means for increasing the stability of aqueous solutions of the copper-alkanolamine complex.

More particularly, according to the invention, it has been found that the stability, particularly in sunlight, of an aqueous solution of a complex formed by the reaction of a water soluble copper salt and an alkanolamine containing at least one alkanol group of one to ten carbon atoms is greatly improved by the addition of a water soluble ionizable ammonium compound, especially an ammonium compound selected from the group consisting of the ammonium salts of acids having a dissociation constant K of from $10^{-8}$ to $10^0$ and ammonium hydroxide.

It has been found that in order to be effective, the concentration of the ammonium compound should be at least 0.5%, based upon the weight of the complex, the effectiveness of the ammonium compound increasing with its concentration.

The upper limit of the concentration of the ammonium compound that may be employed is determined solely by its solubility in an aqueous solution of the complex, the maximum value depending upon the particular ammonium compound employed.

Among the ammonium salts that have been found useful are ammonium nitrate, diammonium phosphate, ammonium chloride, ammonium carbonate, ammonium thiosulfate, ammonium thiocyanate, ammonium sulfate, ammonium ferrocyanide, ammonium ferricyanide, ammonium chlorate, ammonium chromate, ammonium dichromate, ammonium iodide, diammonium citrate, ammonium acetate, ammonium propionate, ammonium oleate, ammonium stearate, ammonium succinate, ammonium formate, ammonium tartrate, ammonium benzoate, ammonium salicylate, ammonium sulfonate and ammonium sulfanilate.

Of these salts, ammonium nitrate has been found to be the most effective. However, for many purposes including use in drinking water, diammonium citrate is preferred because of its low toxicity.

In each of these cases, while a minimum concentration of 0.5% of the ammonium salt has been found to be effective, concentrations of at least 1% by weight have been found to be particularly effective.

As has been stated supra, the maximum concentration of the ammonium salt is determined by its solubility in a solution of the complex. Thus for ammonium nitrate the maximum concentration is greater than 5% and for diammonium phosphate the maximum concentration is about 2%.

Besides the concentration of the ammonium compound, it has been found that the pH of the solution is important in determining the stability of the complex. Thus it has been found that little or no improvement in stability has been obtained with solutions having pH values of below 7 while best results are obtained with solutions having pH values of 7.3 to 8.3.

The copper salt employed in forming the complex may be any water soluble copper salt, for example a sulfate, chloride, bromide, acetate or nitrate of copper. Of these salts, copper sulfate is preferred because of its high availability and lower cost.

The alkanolamine that is employed includes at least one alkanol group containing from one to 10 carbon atoms. Examples of such alkanolamines are monomethanolamine, monoethanolamine, monoisopropanolamine, diethanolamine, diisopropanolamine, triethanolamine, triisopropanolamine, methylethanolamine, ethylethanolamine, diethylethanolamine, aminoethylethanolamine, dibutylethanolamine, diisopropyletharìolamine, diethylhexylethanolamine, phenylethanolamine, dibutylisopropanolamine, methyldiethanolamine, ethyldiethanolamine, and phenyldiethanolamine.

Of these alkanolamines, triethanolamine has been found to be the most effective, as a smaller amount of the triethanolamine is required than the other alkanolamines to keep the copper ions in solution.

In forming the complex in general, the alkanolamine is employed in a weight ratio of about 1 to 2 parts to one part of the copper salt.

The algaecide composition is generally stored in the form of a concentrated aqueous solution containing at least 50% by weight of the complex and preferably from 50 to 80% by weight.

In general, before use, the concentrated solution is diluted in a ratio of up to 200 parts of water for each part of the concentrated solution.

The amount of the dilute solution applied to the body of water treated is generally such as to supply about 0.25 to 20.0 ppm of the complex.

The algaecidal composition of the invention is effective against all common types of algae which are known to be controlled by copper salts including Chara, Nitella, Chlorophyceae such as Cladophora, Hydrodictyon and Spirogyra and Cyanophyceae such as Anabaena and Microcystis.

Due to the increased stability of the concentrated algaecidal composition of the invention, it may be stored in transparent containers without forming precipitates, for significantly longer periods of time than compositions containing the complex alone or even the complex and the butynediol-alkali metal chlorate mixture of U.S. Pat. No. 3,716,351.

The invention will now be described in greater detail with reference to the following example.

EXAMPLE 1

216 pounds of diammonium citrate were added to 369.5 gallons of water while stirring. Stirring was continued until the ammonium citrate dissolved.

To the resultant solution 3,078 pounds of copper sulfate pentahydrate were added with stirring. 3,780 pounds of triethanolamine (99% amine content) were then slowly added with stirring to the resultant suspension. The rate of the addition of the triethanolamine was adjusted to keep the temperature of the mixture below 52° C. The suspension became thicker and became milky in appearance and finally became a clear deep dark blue-green solution as all the copper sulfate became solubilized.

After the temperature of the solution cooled to below 37.7° C the pH was adjusted to 7.3–7.9 by the addition of caustic soda (50% liquid).

Concentrated algaecidal solutions were prepared according to this example but with diammonium phosphate and with ammonium nitrate in place of the diammonium citrate.

In order to determine the stability of the algaecidal concentrates of the invention, control samples of the concentrates of the invention were compared with concentrates containing only a copper complex and with concentrates containing a copper complex and the butynediol-KClO₃ or NaClO₃ mixture of U.S. Pat No. 3,716,351. In each case 6 ounces of an aqueous solution containing 63% by weight of a copper sulfate-triethanolamine complex containing 45% by weight of copper sulfate were placed in a stoppered clear glass container and exposed to outdoor summer sunlight.

The following results were observed:

| Additive | Days for Observable Precipitate to Form |
| --- | --- |
| None | 3–5 |
| 0.5 % Butynediol + 0.5% KClO₃ | 7–9 |
| 0.5 % Butynediol + 0.5% NaClO₃ | 8–12 |
| 1 % Diammonium Citrate | 10–15 |
| 2 % Diammonium Citrate | 25–30 |
| 1 % Diammonium Phosphate | 15–20 |
| 2 % Diammonium Phosphate | 25–30 |
| 1 % Ammonium Nitrate | 25–30 |
| 2 % Ammonium Nitrate | More than 6 months |

What is claimed is:

1. A concentrated aqueous algaecide composition having an improved stability against photodecomposition, said composition consisting essentially of an aqueous solution of at least 50% by weight of a complex formed by reacting about 1 part of a water soluble copper salt and about 1 to 2 parts of an alkanolamine having at least one alkanol group of 1 to 10 carbon atoms and at least 0.5% based on the weight of the complex of a water-soluble ionizable ammonium compound and having a pH greater than 7.

2. The algaecide composition of claim 1 wherein the ammonium compound is selected from the group consisting of diammonium citrate, diammonium phosphate and ammonium nitrate.

3. A concentrated aqueous algaecide composition having an improved stability against photodecomposition, said composition consisting essentially of an aqueous solution of at least 50% by weight of a complex formed by reacting about 1 part of a water soluble copper salt and about 1 to 2 parts of an alkanolamine having at least one alkanol group of 1 to 10 carbon atoms and at least 0.5% based on the weight of the complex of diammonium citrate and having a pH greater than 7.

4. The algaecide composition of claim 3 wherein the pH is from 7.3 to 8.3.

5. The algaecide composition of claim 3 wherein the copper salt is copper sulfate.

6. The algaecide compostion of claim 5 wherein the alkanolamine is triethanolamine.

7. The algaecide composition of claim 4 wherein at least 1% by weight based upon the complex of the ammonium salt is used.

8. The algaecide composition of claim 3 wherein the diammonium citrate is present in an amount of at least 1% based on the weight of the complex.

9. The algaecide composition of claim 8 wherein the pH is from 7.3 to 8.3.

10. The algaecide composition of claim 9 wherein the alkanolamine is triethanolamine.

11. A concentrated aqueous algaecide composition having an improved stability against photodecompostion, said composition consisting essentially of an aqueous solution of at least 50% by weight of a complex formed by reacting about 1 part of a water soluble copper salt and about 1 to 2 parts of an alkanolamine having at least one alkanol group to 1 to 10 carbon atoms and at least 0.5% based on the weight of the complex of the ammonium nitrate and having a pH greater than 7.

12. The algaecide composition of claim 11 wherein the ammonium nitrate is present in an amount of at least 1% based on the weight of the complex.

13. The algaecide composition of claim 12 wherein the pH is from 7.3 to 8.3.

14. The algaecide composition of claim 13 wherein the copper salt is copper sulfate.

15. The algaecide composition of claim 14 wherein the alkanolamine is triethanolamine.

16. A concentrated aqueous algaecide composition having an improved stability against photodecomposition, said composition consisting essentially of an aqueous solution of at least 50% by weight of a complex formed by reacting about 1 part of a water soluble copper salt and about 1 to 2 parts of an alkanolamine having at least one alkanol group of 1 to 10 carbon atoms and at least 0.5% based on the weight of the complex of ammonium hydroxide and having a pH greater than 7.

17. The algaecide composition of claim 16 wherein the pH is from 7.3 to 8.3.

18. A concentrated algaecide composition having an improved stability against photodecomposition, consisting essentially of an aqueous solution containing at least 50% by weight of a complex formed by reacting about 1 part copper sulfate and about 1 to 2 parts of triethanolamine and at least 1%, based on the weight of the complex, of diammonium citrate and having a pH of from 7.3 to 8.3.

19. A concentrated algaecide composition having improved stability against photodecomposition consisting essentially of an aqueous solution containing at least 50% by weight of a complex formed by reacting about 1 part copper sulfate and about 1 to 2 parts of triethanolamine and at least 1%, based on the weight of the complex, of ammonium nitrate and having a pH of from 7.3 to 8.3.s

* * * * *